(12) United States Patent
Nagura et al.

(10) Patent No.: US 7,810,886 B2
(45) Date of Patent: Oct. 12, 2010

(54) LOCK DEVICE AND SEAT RECLINING APPARATUS

(75) Inventors: Mikihito Nagura, Okazaki (JP); Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 189 days.

(21) Appl. No.: 11/995,348

(22) PCT Filed: Jul. 26, 2006

(86) PCT No.: PCT/JP2006/314730

§ 371 (c)(1), (2), (4) Date: Jan. 11, 2008

(87) PCT Pub. No.: WO2007/013488

PCT Pub. Date: Feb. 1, 2007

(65) Prior Publication Data

US 2009/0224583 A1    Sep. 10, 2009

(30) Foreign Application Priority Data

Jul. 27, 2005    (JP)    ............................. 2005-217357

(51) Int. Cl.
*B60N 2/02*    (2006.01)
*B60N 2/48*    (2006.01)

(52) U.S. Cl. ................ 297/366; 297/367 L; 297/367 P; 297/367 R

(58) Field of Classification Search .................. 297/367, 297/369, 366
See application file for complete search history.

(56) References Cited

U.S. PATENT DOCUMENTS

| | | | | |
|---|---|---|---|---|
| 4,743,061 A | * | 5/1988 | Pompa | 296/152 |
| 5,163,736 A | * | 11/1992 | Aljundi | 297/378.11 |
| 6,244,661 B1 | * | 6/2001 | Timon et al. | 297/378.11 |
| 6,609,756 B2 | * | 8/2003 | Kojima et al. | 297/367 R |
| 6,715,835 B2 | * | 4/2004 | Hoshihara et al. | 297/366 |
| 6,854,802 B2 | * | 2/2005 | Matsuura et al. | 297/367 R |

FOREIGN PATENT DOCUMENTS

| | | |
|---|---|---|
| JP | 2002 65387 | 3/2002 |
| JP | 2002 101996 | 4/2002 |

\* cited by examiner

*Primary Examiner*—David Dunn
*Assistant Examiner*—Erika Garrett
(74) *Attorney, Agent, or Firm*—Oblon, Spivak, McClelland, Maier & Neustadt, L.L.P.

(57) ABSTRACT

A lock device capable of suppressing a lack of smoothness in an unlocking operation, and of suppressing, in a case a plurality of lock members are operated by a cam member, unevenness in the timing for the plurality of lock members to become engaged in a locking operation. Guide portions of a lower guide include a plurality of cam guide faces that are arranged away from each other in the circumferential direction. A cam includes a plurality of guided faces that respectively abut against the plurality of cam guide faces in a release phase. The guided face in a direction in which the cam is decentered by a biasing force of the lock spring is extended to the release phase side with respect to the other guided faces.

6 Claims, 8 Drawing Sheets

US 7,810,886 B2

LOCK DEVICE AND SEAT RECLINING APPARATUS

TECHNICAL FIELD

The present invention relates to a lock device capable of causing engagement and release between two members, and a seat reclining apparatus using this lock device for adjusting the angle between a seat cushion and a seat back.

BACKGROUND ART

As a technique regarding a lock device used in a seat reclining apparatus, for example, Patent Document 1 has disclosed a technique below. This lock device is configured substantially as in embodiments of the present invention described later. More specifically, as shown in FIGS. 7 and 8, a lower guide 51, an upper gear 52, a ring holder 53, three poles 54, a cam 55, and a spring 56 are provided. Internal teeth 52a are formed on an inner circumferential face of the upper gear 52. On the other hand, external teeth 54a that become engaged with the internal teeth 52a are formed on the outer peripheral end faces of the three poles 54. The cam 55 swings between a lock phase and a release phase, thereby causing the three poles 54 to become synchronously engaged with or released from the internal teeth 52a. The spring 56 biases the cam 55 in a direction to cause the poles 54 to become engaged with the internal teeth 52a. The lower guide 51 has guide portions 57 for guiding the cam 55 and the poles 54. The lower guide 51 and the upper gear 52 are opposed to each other and combined in a relatively rotatable manner.

As shown in FIG. 8, radial movement of the cam 55 is regulated by a guide face 57a that is constituted by the inner peripheral face of the guide portion 57 formed on the lower guide 51, and the cam 55 is guided so as to be swingable only in the peripheral direction. It should be noted that there is a clearance between the guide face 57a and a guided face 55a on the outer periphery of the cam 55, and the cam 55 can loosely move to some extent in the radial direction. Herein, the clearance between the guide face 57a and the guided face 55a of the cam 55 is wide in a state where the cam 55 is close to the lock phase, and narrow in a state where the cam 55 is close to the release phase. On the other hand, in a state where the cam 55 is in the lock phase, the three poles 54 that have been pushed by the cam 55 outward in the radial direction become engaged with the internal teeth 52a of the upper gear 52. Accordingly, the cam 55 is supported by the three poles 54 with respect to the upper gear 52.

Patent Document 1: JP 2002-101996A

DISCLOSURE OF THE INVENTION

Problem to be Solved by the Invention

In the above-described lock device, in a state where the cam 55 is close to the lock phase and the poles 54 are not engaged with the internal teeth 52a of the upper gear 52, the cam 55 can move in the radial direction within the clearance between the guide face 57a and the guided face 55a. Thus, the cam 55 is decentered to any direction by a biasing force of the spring 56. Thus, when the cam 55 is locked by being displaced from the release phase to the lock phase, the three poles 54 are not synchronized with each other, and thus unevenness may occur in the timing to become engaged with the internal teeth 52a of the upper gear 52. Furthermore, when the cam 55 is unlocked by being displaced from the lock phase to the release phase, the vicinity of an end portion of the guided face 55a in a direction in which the cam is decentered is pressed against the guide face 57a due to a biasing force of the spring 56. Accordingly, a frictional force between the guide face 57a and the guided face 55a increases, and thus a lack of smoothness may occur in an unlocking operation.

The present invention was arrived at in view of the above-described problems, and it is an object thereof to provide: a lock device capable of suppressing a lack of smoothness in an unlocking operation, and of suppressing, in a case where there are a plurality of lock members that are operated by a cam member, unevenness in the timing for the plurality of lock members to become engaged in a locking operation; and a seat reclining apparatus using this lock device.

Means for Solving Problem

In order to achieve the object, a feature of the present invention is directed to a lock device, comprising: a first member having an engaged portion; a lock member capable of being engaged with the engaged portion; a cam member swinging between a predetermined lock phase and release phase, thereby causing the lock member to operate between an engage posture and a release posture with respect to the engaged portion; a second member having a guiding portion for guiding swing of the cam member; and a biasing member for biasing the cam member in a peripheral direction, wherein the guiding portion has a plurality of guide faces that are arranged away from each other along a circumferential direction, the cam member has a plurality of guided faces that respectively abut against the plurality of guide faces in the release phase, and the guided face in a direction in which the cam member is decentered by a biasing force of the biasing member is extended to the release phase side with respect to the other guided faces.

With this feature, when the biasing member applies a biasing force to the cam member in a direction to decenter the cam member, the extended guided face in the decentered direction abuts against the guide face of the guiding portion. Thus, radial movement of the cam member can be restricted, and thus decentering of the cam member can be suppressed. Furthermore, at that time, the contact area between the guide face and the guided face can be made large, and the contact angle between these faces can be made small. Thus, a lack of smoothness can be suppressed between the guided face and the guide face in an unlocking operation. Moreover, in a case where there are a plurality of lock members that are operated by the cam member, unevenness in the timing for the plurality of lock members to become engaged in a locking operation can be suppressed.

Another feature of the present invention is directed to a lock device, comprising: a first member having an engaged portion; a lock member capable of being engaged with the engaged portion; a cam member swinging between a predetermined lock phase and release phase, thereby causing the lock member to operate between an engage posture and a release posture with respect to the engaged portion; a second member having a guiding portion for guiding swing of the cam member; and a biasing member for biasing the cam member in a peripheral direction, wherein the guiding portion has a plurality of guide faces that are arranged away from each other along a circumferential direction, the cam member has a plurality of cam projecting portions that are formed so as to project outward in a radial direction, and a plurality of guided faces that are formed on outer peripheral portions of the respective cam projecting portions and that respectively abut against the plurality of guide faces in the release phase, at least the cam projecting portion in a direction in which the cam member is decentered by a biasing force of the biasing member has an extended portion expanded to the release phase side so as to be progressively away from an operation direction of the lock member as it extends toward an outer side in a radial direction in a state where the cam member is in the lock phase, and the guided face includes an outer peripheral portion of the extended portion.

With this feature, when the biasing member applies a biasing force to the cam member in a direction to decenter the cam member, the guided face extended to the release phase side with an extended portion of the cam projecting portion in the decentered direction abuts against the guide face of the guiding portion. Thus, radial movement of the cam member can be restricted, and thus decentering of the cam member can be suppressed. Furthermore, at that time, the contact area between the guide face and the guided face can be made large, and the contact angle between these faces can be made small. Thus, a lack of smoothness can be suppressed between the guided face and the guide face in an unlocking operation. Moreover, in a case where there are a plurality of lock members that are operated by the cam member, unevenness in the timing for the plurality of lock members to become engaged in a locking operation can be suppressed.

Another feature of the present invention is directed to a lock device, comprising: a first member having an engaged portion; a lock member capable of being engaged with the engaged portion; a cam member swinging between a predetermined lock phase and release phase, thereby causing the lock member to operate between an engage posture and a release posture with respect to the engaged portion; a second member having a guiding portion for guiding swing of the cam member; and a biasing member for biasing the cam member in a peripheral direction, wherein the guiding portion has a plurality of guide faces that are arranged away from each other along a circumferential direction, the cam member has a plurality of guided faces that respectively abut against the plurality of guide faces in the release phase, at least the guided face in a direction in which the cam member is decentered by a biasing force of the biasing member, and the guide face opposed thereto have an area in which the guided face and the guide face are opposed to each other in a state where the cam member is in the lock phase, and the length in a peripheral direction of the opposed area is at least one tenth of the distance from a swing axis of the cam member to the guided face. It should be noted that the length in the peripheral direction of the opposed area is preferably at least one eighth of the distance from the swing axis of the cam member to the guided face, and more preferably at least one fifth of this distance.

With this feature, in a state where the cam member is close to the lock phase and the lock member is not engaged with the engaged portion, opposed portions of the guided face of the cam member and the guide face of the guiding portion abut against each other. Thus, radial movement of the cam member can be restricted, and thus decentering of the cam member caused by a biasing force of the biasing member can be suppressed. Accordingly, in a case where there are a plurality of lock members that are operated by the cam member, unevenness in the timing for the plurality of lock members to become engaged in a locking operation can be suppressed. Furthermore, the length in the peripheral direction of the area in which the guided face and the guide face are opposed to each other in a state where the cam member is in the lock phase is at least one tenth of the distance from the swing axis of the cam member to the guided face. Thus, the contact area between the guide face and the guided face can be made large, and the contact angle between these faces can be made small. Thus, a lack of smoothness can be suppressed between the guided face and the guide face in an unlocking operation.

Moreover, it is preferable that the angle between a tangent of the guide face and a tangent of the guided face in the opposed area is not greater than 5° in a state where the cam member is in the lock phase. It is more preferable that the angle between a tangent of the guide face and a tangent of the guided face in the opposed area is not greater than 3°.

Accordingly, engagement of the lock member with the engaged portion is released, and the contact angle when the guide face and the guided face are actually brought into contact with each other can be made small. Thus, a lack of smoothness can be suppressed between the guided face and the guide face in an unlocking operation.

Moreover, it is preferable that the engaged portion is provided along a circumferential direction, the cam member causes the lock members arranged in plural opposed to the engaged portion along a circumferential direction to synchronously operate, and the guide faces and the guided faces are not brought into contact with each other in a state where the cam member is in the lock phase and all of the lock members are engaged with the engaged portion.

Accordingly, when the cam member is shifted to the lock phase and the lock members become engaged with the engaged portion, even if the cam member is decentered from the designed swing axis, for example, due to processing errors in size of the cam member, the lock members, and the first member, radial movement of the cam member is not regulated by the guide face of the guiding portion. Thus, the load can be applied equally to the plurality of lock members.

Moreover, it is preferable that the guide faces and the guided faces are formed such that a clearance between the guide faces and the guided faces becomes smaller as the cam member is displaced from the lock phase to the release phase side.

Accordingly, the cam member can be guided as appropriate in the rotational direction, while the cam member in the lock phase is allowed to move to some extent in the radial direction, and a lack of smoothness is suppressed between the guided face and the guide face when the cam member is displaced from the lock phase to the release phase side.

Furthermore, it is preferable that a seat reclining apparatus comprises the lock device having the above-described characteristics and can adjust the angle between a seat cushion and a seat back, wherein the first member is attached to either one of the seat cushion and the seat back, the second member is attached to the other of the seat cushion and the seat back, the first member and the second member are engaged with each other in a relatively rotatable manner, and the seat reclining apparatus further comprises an operation portion for swinging the cam member.

Accordingly, when changing the reclining angle by operating the operation portion to swing the cam member, a lack of smoothness can be suppressed between the guided face and the guide face in an unlocking operation. Moreover, in a case where there are a plurality of lock members that are operated by the cam member, unevenness in the timing for the plurality of lock members to become engaged in a locking operation can be suppressed. Accordingly, a seat reclining apparatus with a good operability can be obtained.

BEST MODE FOR CARRYING OUT THE INVENTION

Hereinafter, embodiments of the present invention shall be described with reference to the drawings. In this embodiment, a case shall be described in which a lock device 1 is applied to a seat reclining apparatus 2 for a vehicle. FIG. 1 is a perspective view illustrating the mainframe of the seat reclining apparatus 2 according to this embodiment.

1. Overall Configuration of the Seat Reclining Apparatus 2

As shown in FIG. 1, the seat reclining apparatus 2 has a seat back frame 3 constituting the mainframe of a seat back, a seat cushion frame 4 constituting the mainframe of a seat cushion, the lock device 1 provided at a portion connecting the seat back frame 3 and the seat cushion frame 4, and an operating lever 5 and a lever shaft 6 serving as an operation portion for operating the lock device 1. When the lock device 1 is in a lock state, the angle of the seat back frame 3 with respect to the seat cushion frame 4 is fixed. On the other hand, when the lock device 1 is shifted to an unlock state by operation of the operating lever 5, the angle of the seat back frame 3 with respect to the seat cushion frame 4 can be changed.

Furthermore, an outer catch member 7 is attached to the seat back frame 3, and an inner catch member 8 is attached to the seat cushion frame 4. An inner end portion 9a of a seat back biasing spring 9 constituted by a spiral spring is caught by the inner catch member 8, and an outer end portion 9b of the seat back biasing spring 9 is caught by the outer catch member 7. Accordingly, the seat back biasing spring 9 biases the seat back frame 3 to the front side of the seat (left side in FIG. 1). Although not shown, a similar configuration excluding the operating lever 5 is provided on the opposite side in the width direction of the seat. The lever shaft 6 is coupled with a counterpart shaft provided on the opposite side in the width direction of the seat. The lock devices 1 respectively provided on both sides in the width direction of the seat are moved in conjunction with each other by operation of the operating lever 5.

2. Overall Configuration of the Lock Device 1

Next, the configuration of the lock device 1 shall be described in detail. FIG. 2 is an exploded perspective view of the lock device 1. FIG. 3 is a cross-sectional view of the lock device 1. FIG. 4 is a view illustrating a state of a cam 13 and poles 12 when the cam 13 of the lock device 1 is in a lock phase. FIG. 5 is a view illustrating a state of the cam 13 and the poles 12 when the cam 13 of the lock device 1 is in a release phase. FIG. 6 is an enlarged view of the main portions of FIG. 4. As shown in FIGS. 3 to 6, the lock device 1 is provided with: an upper gear 11 whose inner circumferential face has internal teeth 11a; three poles 12 whose outer peripheral end faces have external teeth 12a that can become engaged with the internal teeth 11a; the cam 13 swinging between a predetermined lock phase and release phase, thereby causing the poles 12 to operate between an engage posture and a release posture with respect to the internal teeth 11a of the upper gear 11; a lower guide 15 having guide portions 14 for guiding swing of the cam 13; and a lock spring 16 for biasing the cam 13 in the peripheral direction. Furthermore, the upper gear 11 and the lower guide 15 are engaged with each other in a relatively rotatable manner. A ring holder 17 fits to the outside of outer circumferential portions of both the upper gear 11 and the lower guide 15, and thus the upper gear 11 and the lower guide 15 are caught so as not to be separated from each other.

In this embodiment, the upper gear 11 corresponds to a "first member" in the present invention, and the internal teeth 11a thereof correspond to an "engaged portion" in the present invention. Furthermore, in this embodiment, the lower guide 15 corresponds to a "second member" in the present invention, and the guide portions 14 thereof correspond to "guiding portions" in the present invention. Furthermore, in this embodiment, the poles 12 correspond to "lock members" in the present invention, the cam 13 corresponds to a "cam member" in the present invention, and the lock spring 16 corresponds to a "biasing member" in the present invention.

3. Upper Gear 11

The upper gear 11 is substantially disk-shaped. A first recess portion 11c (see FIG. 3) in the shape of a recess that has a cylindrical inner circumferential face coaxial with an outer circumferential face 11b is formed in the upper gear 11 on the side of the lower guide 15. The internal teeth 11a are formed on the cylindrical inner circumferential face of the first recess portion 11c. Furthermore, a second recess portion 11d in the shape of a recess that has a cylindrical inner circumferential face coaxial with the outer circumferential face 11b and that is deeper than the bottom face of the first recess portion 11c is formed in the first recess portion 11c on the inner side in the radial direction. The first recess portion 11c and the second recess portion 11d, together with a third recess portion 15a and a fourth recess portion 15b of the lower guide 15 described later, constitute a space for accommodating the poles 12, the cam 13, and the lock spring 16 in a state where the upper gear 11 is engaged with the lower guide 15. Furthermore, a through hole 11f through which the lever shaft 6 passes is provided in the upper gear 11 at the central portion in the radial direction.

Moreover, the face of the upper gear 11 on the side opposite to the lower guide 15 has a plurality of (herein, six) engagement projecting portions 11e that are provided at constant intervals in the circumferential direction. As shown in FIGS. 1 and 3, a plurality of (herein, six) engagement holes 3a are provided in the seat back frame 3 at positions corresponding to the engagement projecting portions 11e. The upper gear 11 is integrally fixed to the seat back frame 3 by welding or the like with the engagement projecting portions 11e engaged with the engagement holes 3a. On the other hand, the portion of the upper gear 11 on the side of the lower guide 15 fits into the third recess portion 15a of the lower guide 15 described later. At that time, the outer circumferential face 11b of the upper gear 11 fits to an inner circumferential face 15c of the third recess portion 15a in a slidable manner. Accordingly, the upper gear 11 and the lower guide 15 are engaged with each other in a relatively rotatable manner. The shape of the upper gear 11 described above is formed by half blanking (incomplete blanking) or the like.

4. Lower Guide 15

The lower guide 15 is substantially disk-shaped. The third recess portion 15a in the shape of a recess that has the cylindrical inner circumferential face 15c coaxial with an outer circumferential face 15e is formed in the lower guide 15 on the side of the upper gear 11. The outer circumferential face 11b of the upper gear 11 fits to the inner circumferential face 15c of the third recess portion 15a. Accordingly, the upper gear 11 fits into and becomes engaged with the third recess portion 15a. Furthermore, the plurality of (herein, six) guide portions 14 formed so as to project with respect to a bottom face 15d of the third recess portion 15a are arranged away from each other in the circumferential direction. The guide portions 14 have cam guide faces 14a that are formed in the circumferential direction and that are for guiding swing of the cam 13. Thus, as shown in FIGS. 4 and 5, the plurality of (herein, six) cam guide faces 14a are arranged away from each other in the circumferential direction. The guide portions 14 also have pole guide faces 14b that are formed substantially in the radial direction such that the pole guide faces 14b of the adjacent guide portions 14 are arranged parallel to each other, and that are for guiding radial movement of the poles 12.

It should be noted that in this embodiment, the cam guide faces 14a correspond to "guide faces" in the present invention.

The fourth recess portion 15b in the shape of a recess that has a cylindrical inner circumferential face coaxial with the outer circumferential face 15e and that is deeper than the bottom face 15d of the third recess portion 15a is formed in the third recess portion 15a on the inner side in the radial direction. The lock spring 16 is disposed in the fourth recess portion 15b on the inner side in the radial direction. A cutout 15f extending outward in the radial direction is formed on a part of an inner circumferential face of the fourth recess portion 15b. An outer end portion 16a of the lock spring 16 constituted by a spiral spring is caught by the cutout 15f. A through hole 15g through which the lever shaft 6 passes is provided in the lower guide 15 at the central portion in the radial direction.

Moreover, the face of the lower guide 15 on the side opposite to the upper gear 11 has a plurality of engagement projecting portions 15h that are provided at constant intervals in the circumferential direction. As shown in FIGS. 1 and 3, a plurality of engagement holes 4a are provided in the seat cushion frame 4 at positions corresponding to the engagement projecting portions 15h. The lower guide 15 is integrally fixed to with the seat cushion frame 4 by welding or the like with the engagement projecting portions 15h engaged with the engagement holes 4a. The shape of the lower guide 15 described above is formed by half blanking (incomplete blanking) or the like.

5. Ring Holder 17

The ring holder 17 is ring-shaped. The ring holder 17 is provided so as to fit to the outside of outer circumferential portions of both the upper gear 11 and the lower guide 15, in a state where the outer circumferential face 11b of the upper gear 11 fits to the inner circumferential face 15c of the third recess portion 15a of the lower guide 15 and thus the upper gear 11 and the lower guide 15 become engaged with each other. Accordingly, the upper gear 11 and the lower guide 15 are allowed to rotate relative to each other, and caught so as not to be separated from each other in the axial direction.

6. Cam 13

The cam 13 is in the shape of a irregular-shaped plate in which a plurality of (herein, three) cam projecting portions 13a that are formed so as to project outward in the radial direction from the central portion in the radial direction provided with a boss portion 13e described later are arranged away from each other in the circumferential direction. Faces on a guide circumference C (see FIG. 6) constituted by a locus of rotation of the outermost peripheral portions of the cam projecting portions 13a constitute guided faces 13b that are guided by the cam guide faces 14a of the guide portions 14. Thus, as shown in FIGS. 4 and 5, the plurality of (herein, three) guided faces 13b are arranged away from each other along the guide circumference C. The outer peripheral end faces of the cam projecting portions 13a that have a rough face when viewed from above (as shown in FIGS. 4 to 6), and a portion thereof excluding the guided faces 13b constitutes cam faces 13c that abut against contact faces 12d of the poles 12 described later. Protruding portions 13d projecting parallel to a swing axis X of the cam 13 are formed on faces of the cam projecting portions 13a on the side of the upper gear 11. The protruding portions 13d are inserted into engagement elongated holes 12c formed through the poles 12 as described later.

On the other hand, the cylindrical boss portion 13e coaxial with the swing axis X is formed so as to project from the face of the cam 13 on the side of the lower guide 15. A fit hole 13f is provided along the swing axis X, at the central portion of the cam 13 in the radial direction including the boss portion 13e. The lever shaft 6 is inserted into and fits to the inside of the fit hole 13f. Accordingly, the cam 13 rotates integrally with the lever shaft 6 and the operating lever 5. More specifically, the operating lever 5 functions as an operation portion for swinging the cam 13. Furthermore, a cutout 13g (see FIGS. 4 to 6) extending inward in the radial direction is formed on a part of an outer circumferential face of the boss portion 13e. An inner end portion 16b of the lock spring 16 constituted by a spiral spring is caught by the cutout 13g.

The configurations of the guided faces 13b of the cam 13 and the cam guide faces 14a of the guide portions 14 opposed thereto are described later in detail.

7. Lock Spring 16

As described above, the lock spring 16 has the outer end portion 16a that is caught by the cutout 15f of the lower guide 15 and the inner end portion 16b that is caught by the cutout 13g of the cam 13. The lock spring 16 is a spiral spring wound counterclockwise from the inner circumferential side to the outer circumferential side when viewed from the upper gear 11. Thus, the lock spring 16 biases the cam 13 in a direction to rotate the cam 13 counterclockwise (counterclockwise in FIGS. 4 to 6) when viewed from the upper gear 11. More specifically, the lock spring 16 biases the cam 13 in a rotational direction to the lock phase side. Accordingly, the poles 12 are biased by the lock spring 16 in a direction to cause the poles 12 to keep the engage posture with the internal teeth 11a of the upper gear 11. The lock spring 16 biases the cam 13 in a substantially peripheral direction. However, the biasing force is not in the peripheral direction in the strict sense, and also causes a biasing force to act in a direction to decenter the cam 13. In this embodiment, the lock spring 16 causes a biasing force to act on the cutout 13g of the cam 13 catching the inner end portion 16b, in a direction of the tangent of a circumferential portion in the vicinity of the inner end portion 16b (substantially upward in FIGS. 4 and 6). Accordingly, the cam 13 receives a biasing force of the lock spring 16 such that the cam 13 is decentered substantially upwardly in FIGS. 4 and 6.

8. Poles 12

The pole 12 is substantially in the shape of a rectangular plate. Herein, the plurality of (herein, three) poles 12 are radially arranged away from each other in the circumferential direction. Each of the poles 12 is guided in a movable manner in the radial direction, with both side faces 12b in the shape of parallel flat faces sliding along the pole guide faces 14b of the guide portions 14 provided on the lower guide 15. The external teeth 12a that become engaged with the internal teeth 11a of the upper gear 11 are formed on the outer peripheral end face of the pole 12. The external teeth 12a are opposed to the internal teeth 11a.

The engagement elongated hole 12c passing through in the thickness direction is formed in the vicinity of an inner peripheral side portion of the pole 12. The engagement elongated hole 12c is formed such that its length direction is inclined with respect to the circumference Centered around the swing axis X of the cam 13. Herein, the engagement elongated hole 12c is inclined inward in the radial direction toward the lock phase side in the rotational direction of the cam 13 (counterclockwise in FIGS. 4 to 6). The protruding portion 13d of the cam 13 is inserted into the engagement elongated hole 12c. Accordingly, the poles 12 and the cam 13 become engaged so as to move in conjunction with each other. Furthermore, a stepped portion is formed on the face of the pole 12 on the side of the lower guide 15, at a middle portion in the length direction between the external teeth 12a and the engagement elongated hole 12c. The inner peripheral face of the stepped portion constitutes the contact face 12d that abuts against the cam face 13c of the cam 13. The contact face 12d has a rough face corresponding to the cam face 13c when viewed from above (as shown in FIGS. 4 to 6).

When the cam 13 swings from the lock phase shown in FIG. 4 to the release phase side shown in FIG. 5, the protruding portion 13d of the cam 13 relatively moves clockwise within the engagement elongated hole 12c, and presses a side face of the engagement elongated hole 12c inward in the radial direction. Accordingly, the pole 12 moves along the pole guide face 14b of the guide portion 14 inward in the radial direction, and obtains a release posture in which the external teeth 12a do not become engaged with the internal teeth 11a of the upper gear 11 as shown in FIG. 5. On the other hand, when the cam 13 swings from the release phase shown in FIG. 5 to the lock phase side shown in FIG. 4, the protruding portion 13d of the cam 13 relatively moves counterclockwise within the engagement elongated hole 12c, and presses a side face of the engagement elongated hole 12c outward in the radial direction. Furthermore, the cam face 13c of the cam 13 presses the contact face 12d of the pole 12 outward in the radial direction. Accordingly, the pole 12 moves along the pole guide face 14b of the guide portions 14 outward in the radial direction, and obtains an engage posture in which the external teeth 12a become engaged with the internal teeth 11a of the upper gear 11 as shown in FIG. 4. That is to say, the cam 13 swings between the lock phase and the release phase, and thus the pole 12 operates between an engage posture to become engaged with the internal teeth 11a of the upper gear 11 and a release posture to release the engagement. When the pole 12 is in the release posture, the upper gear 11 and the lower guide 15 are allowed to rotate relative to each other. When the pole 12 is in the engage posture, the upper gear 11 and the lower guide 15 are prevented from rotating relative to each other. It should be noted that, as shown in FIG. 4, in a state where the cam 13 is in the lock phase and all of the poles 12 are in the engage posture, the cam 13 is supported in the radial direction by the plurality of (herein, three) poles 12.

9. Configurations of the Guided Faces 13b and the Cam Guide Faces 14a

The plurality of (herein, three) guided faces 13b (including an extended guided face 13b described later) of the cam 13 and the cam guide faces 14a of the guide portions 14 opposed thereto are not brought into contact with each other in a state where the cam 13 is in the lock phase and all of the external teeth 12a of the poles 12 are engaged with the internal teeth 11a of the upper gear 11 as shown in FIGS. 4 and 6. More specifically, the cam 13 is supported in the radial direction not by the guide portions 14 but by the poles 12 in the lock phase. With this configuration, in the lock phase, radial movement of the cam 13 is not regulated by the guide portions 14, and the cam 13 is allowed to be decentered. Thus, even with processing errors in size of the cam 13, the poles 12, and the upper gear 11, unevenness in the timing for the plurality of poles 12 to become engaged with the upper gear 11 can be suppressed. This configuration can be achieved by designing a gap N at a position where the guided face 13b and the cam guide face 14a are closest to each other when the cam 13 is in the lock phase, to be equal to or larger than the amount in which the swing axis X of the cam 13 is decentered by processing errors in size of the cam 13, the poles 12, and the upper gear 11.

On the other hand, the guided faces 13b and the cam guide faces 14a abut against each other in a state where the cam 13 is in the release phase as shown in FIG. 5. More specifically, the guided faces 13b of the cam 13 and the cam guide faces 14a of the guide portions 14 are formed such that a clearance between the mutually opposed faces becomes smaller as the cam 13 is displaced from the lock phase to the release phase side. Herein, as shown also in FIG. 6, the guided face 13b of the cam 13 is formed so as to be on the guide circumference C. Accordingly, the cam guide face 14a of the guide portion 14 is formed so as to have a face gradually closer to the guide circumference C from the lock phase side in the rotational direction of the cam 13 (hereinafter, simply referred to as the "lock phase side") to the release phase side in the rotational direction of the cam 13 (hereinafter, simply referred to as the "release phase side"), and matches the guide circumference C in the vicinity of its end portion on the release phase side. Accordingly, on the cam guide face 14a, an area that matches the guide circumference C serves as a regulation area substantially for regulating decentering of the swing axis X of the cam 13 and for guiding swing, and an area withdrawn outward in the radial direction from the guide circumference C serves as an introduction area for smoothly introducing the guided face 13b of the cam 13 to the regulation area.

Furthermore, in this embodiment, among the plurality of (herein, three) cam projecting portions 13a of the cam 13, the cam projecting portion 13a in a direction in which the cam 13 is decentered (substantially above in FIGS. 4 to 6) by a biasing force of the lock spring 16 has an extended portion (expanded portion) E expanded to the release phase side so as to be away from the operation direction of the pole 12 (herein, the direction parallel to the pole guide face 14b) toward the outer side in the radial direction in a state where the cam 13 is in the lock phase as shown in FIG. 6. Herein, the extended portion E has a flat side face Ea that is formed so as to have a predetermined angle with respect to the operation direction of the pole 12, and to be away to the release phase side toward the outer side in the radial direction, in a state where the cam 13 is in the lock phase. It should be noted that the shape of the side face Ea of the extended portion E is not limited to a flat face, and the side face Ea also may be a curved face that is formed so as to be away to the release phase side toward the outer side in the radial direction. The guided face 13b of the cam projecting portion 13a having the extended portion E includes the outer peripheral portion of the extended portion E. Herein, the entire outer peripheral face of the extended portion E serves as the guided face 13b on the guide circumference C. Accordingly, among the plurality of (herein, three) guided faces 13b of the cam 13, the guided face 13b in a direction in which the cam 13 is decentered by a biasing force of the lock spring 16 is extended to the release phase side with respect to the other guided faces 13b. The guided face 13b of the cam projecting portion 13a provided with the extended portion E, and the cam guide face 14a of the guide portion 14 opposed thereto have an opposed area A in which the guided face 13b and the cam guide face 14a are opposed to each other, in a state where the cam 13 is in the lock phase. Herein, the length of the arc of the opposed area A in a direction along the guide circumference C is one tenth or more of a distance D (herein, the radius of the guide circumference C) from the swing axis X of the cam 13 to the guided face 13b, preferably one eighth or more of the distance D, and more preferably one fifth or more of the distance D. There is no particular limitation on the upper limit of the length of the arc of the opposed area A in the direction along the guide circumference C, except for a limitation due to the shape and the arrangement of the cam projecting portion 13a and the guide portion 14, and any length may be applied. It should be noted that the effect of suppressing decentering of the cam 13 practically does not change even if the length of the arc of the opposed area A in the direction along the guide circumference C is more than a certain length. Such an upper limit of the length of the arc of the opposed area A in the direction along the guide circumference C varies depending on the shape of the cam projecting portion 13a, the guided face 13b thereof, the guide portion 14, and the cam guide face 14a thereof, but the upper limit is approximately half to one third of the distance D from the swing axis X of the cam 13 to the guided face 13b, for example.

In this manner, the opposed area A of the guided face 13b of the cam 13 and the cam guide face 14a of the guide portion 14 is provided, and thus decentering of the cam 13 can be suppressed in swing from the lock phase to the release phase and swing from the release phase to the lock phase. More specifically, the cam 13 is to be decentered by a biasing force of the lock spring 16 in a state where the cam 13 is on the release phase side of the lock phase and the poles 12 are not engaged with the upper gear 11. However, due to the abutment between the guided face 13b of the cam 13 and the cam guide face 14a of the guide portion 14 at the opposed area A, radial movement of the cam 13 is restricted, and thus decentering of the cam 13 is suppressed. Thus, unevenness in the timing for the plurality of poles 12 to become engaged can be suppressed when the cam 13 swings to as from the release phase side to the lock phase and thus the poles 12 become engaged with the upper gear 11 (in a locking operation). Furthermore, the length of the opposed area A is made sufficiently long as described above, and thus the contact area between the guided face 13b and the cam guide face 14a can be made large, and the contact angle between these faces can be made small. Thus, a lack of smoothness can be suppressed between the guided face 13b and the cam guide face 14a when the cam 13 swings from the lock phase to the release phase side (in an unlocking operation).

Furthermore, an angle θ between the tangents is preferably 5° or less at a position where the guided face 13b of the cam projecting portion 13a and the cam guide face 14a of the guide portion 14 opposed thereto are closest to each other at the opposed area A in a state where the cam 13 is in the lock phase. The angle θ is more preferably 3° or less. With this configuration, the contact angle between the guided face 13b and the cam guide face 14a becomes small when the cam 13 swings from the lock phase to the release phase side. Thus, a lack of smoothness can be suppressed between the guided face 13b and the cam guide face 14a in an unlocking operation.

10. Description of Operation

With the thus configured lock device 1, an unlocking operation is performed by operation of the operating lever 5 that causes the cam 13 to swing from the lock phase shown in FIG. 4 to the release phase side (clockwise in FIG. 4) resisting a biasing force of the lock spring 16. At that time, immediately after the cam 13 starts to swing from the lock phase to the release phase side, engagement of the poles 12 with the upper gear 11 is released, and the cam 13 is to be decentered by a biasing force of the lock spring 16. However, the guided face 13b of the cam 13 and the cam guide face 14a of the guide portion 14 that are opposed to each other with a slight gap N abut against each other in a large area, and thus radial movement of the cam 13 is restricted, and decentering of the cam 13 is suppressed. Furthermore, the contact angle between the guided face 13b and the cam guide face 14a can be made small. Thus, a lack of smoothness can be suppressed between the guided face 13b and the cam guide face 14a when the cam 13 swings from the lock phase to the release phase side. Subsequently, when the cam 13 is further displaced to the release phase side, the guided face 13b of the cam 13 becomes to be opposed to the regulation area that matches the guide circumference C (see FIG. 6) of the cam guide face 14a. Accordingly, decentering of the cam 13 is almost completely regulated. Then, the cam 13 swings while decentering is regulated by the cam guide face 14a, until the cam 13 is shifted to the release phase shown in FIG. 5. When the cam 13 swings from the lock phase to the release phase side as described above, the plurality of poles 12 synchronously move inward in the radial direction to obtain the release posture shown in FIG. 5. Accordingly, the upper gear 11 is allowed to rotate relative to the lower guide 15, and the angle of the seat back frame 3 with respect to the seat cushion frame 4 can be changed.

Furthermore, when the operating lever 5 is returned, the cam 13 swings from the release phase shown in FIG. 5 to the lock phase side (counterclockwise in FIG. 5) due to a biasing force of the lock spring 16, and thus a locking operation is performed. At that time, decentering of the cam 13 is almost completely regulated in a state where the guided face 13b is opposed to the regulation area that matches the guide circumference C (see FIG. 6) of the cam guide face 14a. Subsequently, when the cam 13 is displaced to the lock phase side, the cam guide face 14a opposed to the guided face 13b is placed at a position withdrawn outward in the radial direction from the guide circumference C, but the guided face 13b and the cam guide face 14a abut against each other in a large area, and thus radial movement of the cam 13 is restricted, and decentering of the cam 13 is suppressed. Thus, when the plurality of poles 12 become engaged with the upper gear 11, unevenness in the timing for the plurality of poles 12 to become engaged can be suppressed. When the cam 13 swings from the release phase to the lock phase side as described above, the plurality of poles 12 synchronously move outward in the radial direction to obtain the lock posture shown in FIG. 4. Accordingly, the upper gear 11 is prevented from rotating relative to the lower guide 15, and the angle of the seat back frame 3 with respect to the seat cushion frame 4 is fixed.

Other Embodiments (1) In the foregoing embodiment, a case was described in which among the plurality of (herein, three) guided faces 13b of the cam 13, only the guided face 13b in a direction in which the cam 13 is decentered by a biasing force of the lock spring 16 is extended to the release phase side with respect to the other guided faces 13b. However, the scope of the present invention is not limited to this. More specifically, any configuration can be applied as long as among the plurality of guided faces 13b, at least the guided face 13b in a direction in which the cam 13 is decentered by a biasing force of the lock spring 16 is opposed to the cam guide face 14a with a sufficiently long opposed area A. Thus, preferable embodiments also includes a configuration in which in addition to the guided face 13b in a direction in which the cam 13 is decentered by a biasing force of the lock spring 16, the other guided faces 13b are extended in a similar manner. Also in this case, a part of the plurality of guided faces 13b can be extended, or all of the guided faces 13b can be extended in a similar manner.

(2) In the foregoing embodiment, a case was described in which the guided face 13b of the cam 13 is formed so as to be on the guide circumference C (see FIG. 6), and the cam guide face 14a of the guide portion 14 is formed so as to have a face gradually closer to the guide circumference C from the lock phase side to the release phase side, and matches the guide circumference C in the vicinity of its end portion on the release phase side. However, there is no limitation to this configuration. Any configuration is preferable as long as the guided face 13b and the cam guide face 14a are formed such that a clearance between the mutually opposed faces becomes smaller as the cam 13 is displaced from the lock phase to the release phase side. Thus, preferable embodiments also includes a configuration in which the opposite relationship is applied to the guided face 13b and the cam guide face 14a; that is, the cam guide face 14a of the guide portion 14 is formed so as to be on the guide circumference C, and the guided face 13b of the cam 13 is formed so as to have a face gradually closer to the guide circumference C from the release phase side to the lock phase side, and matches the guide circumference C in the vicinity of its end portion on the lock phase side.

(3) In the foregoing embodiment, a case was described in which the lock device 1 is applied to the seat reclining apparatus 2 for a vehicle. However, the scope of the lock device according to the present invention is not limited to this. More specifically, the lock device according to the present invention can be preferably applied also to seats not for a vehicle. Furthermore, the lock device can be used not only for seat reclining apparatuses but also for various other applications, because the lock device can adjust and fix the angle at which two members rotate relative to each other.

Figure 1:
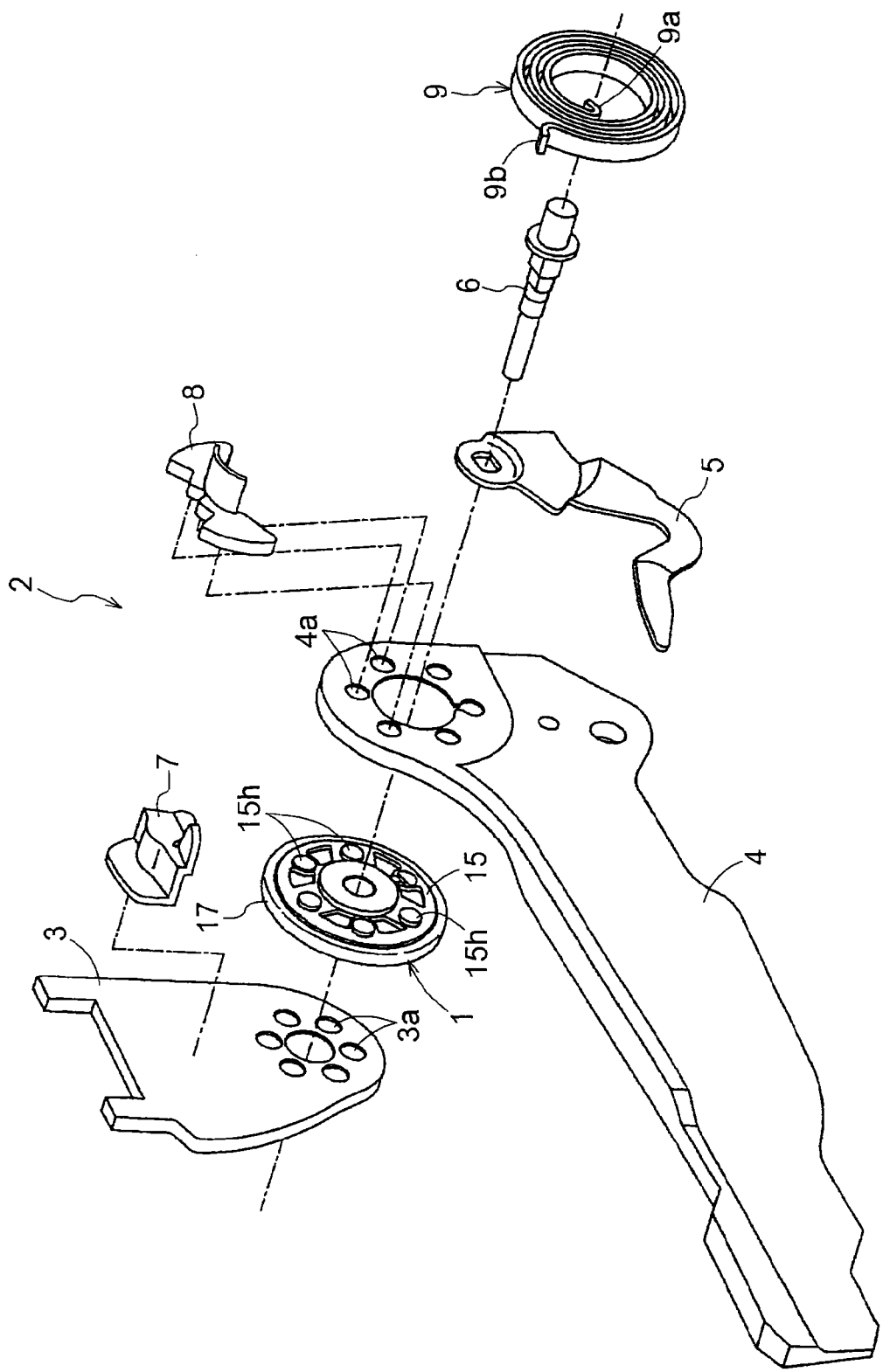
FIG. 1 is a perspective view illustrating the mainframe of a seat reclining apparatus according to an embodiment of the present invention.
Figure 2:
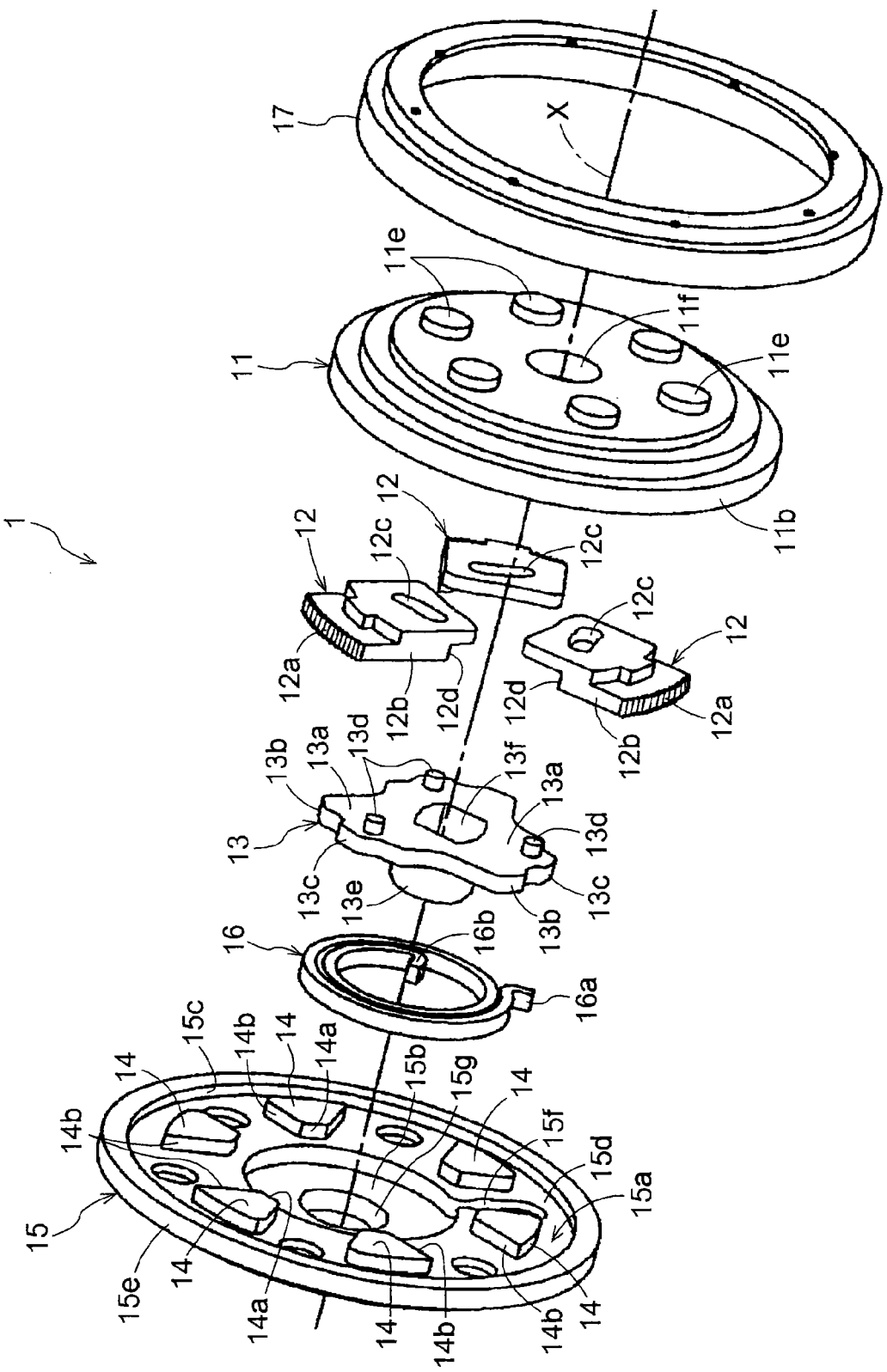
FIG. 2 is an exploded perspective view of a lock device according to the embodiment of the present invention.
Figure 3:
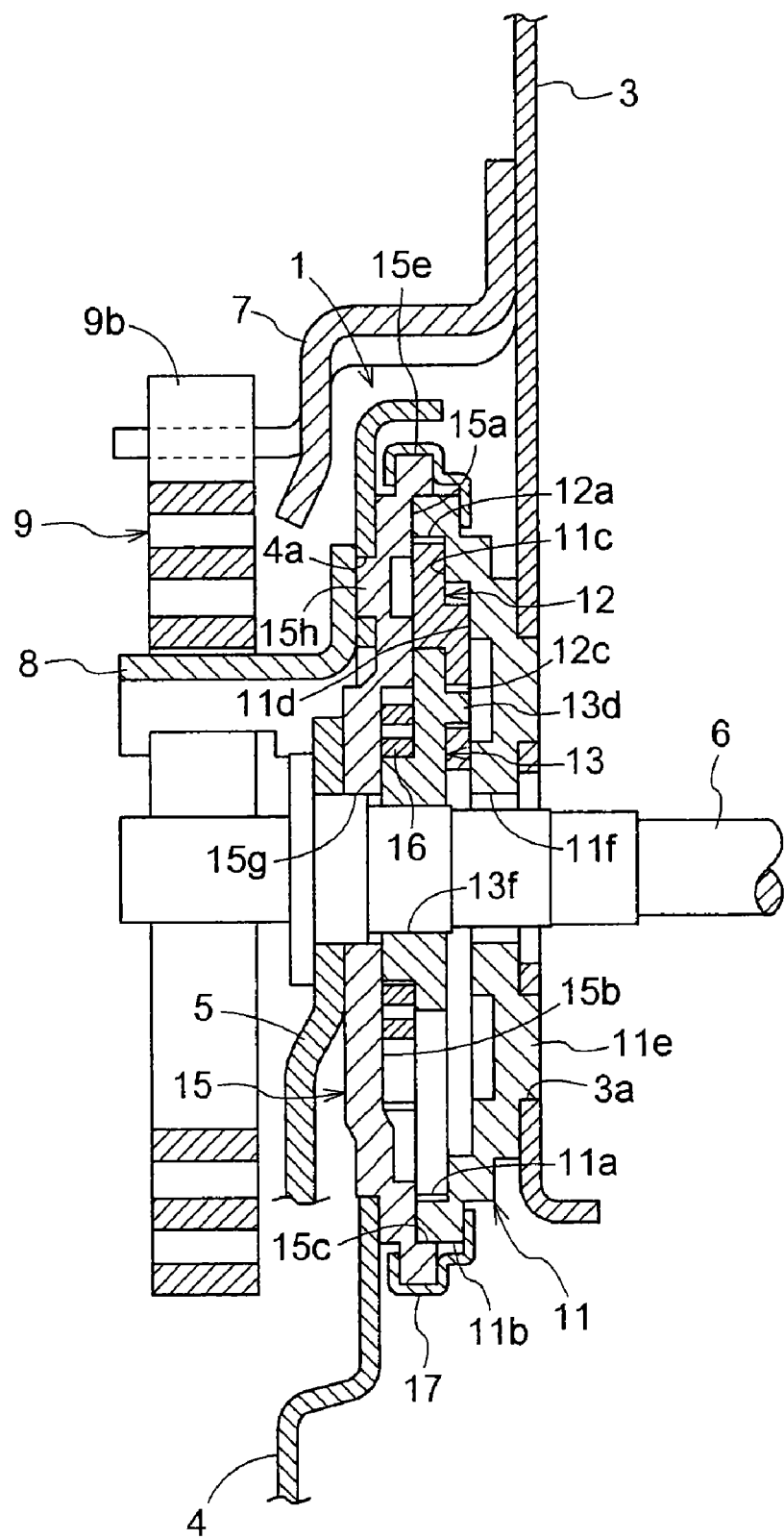
FIG. 3 is a cross-sectional view of the lock device according to the embodiment of the present invention.
Figure 4:
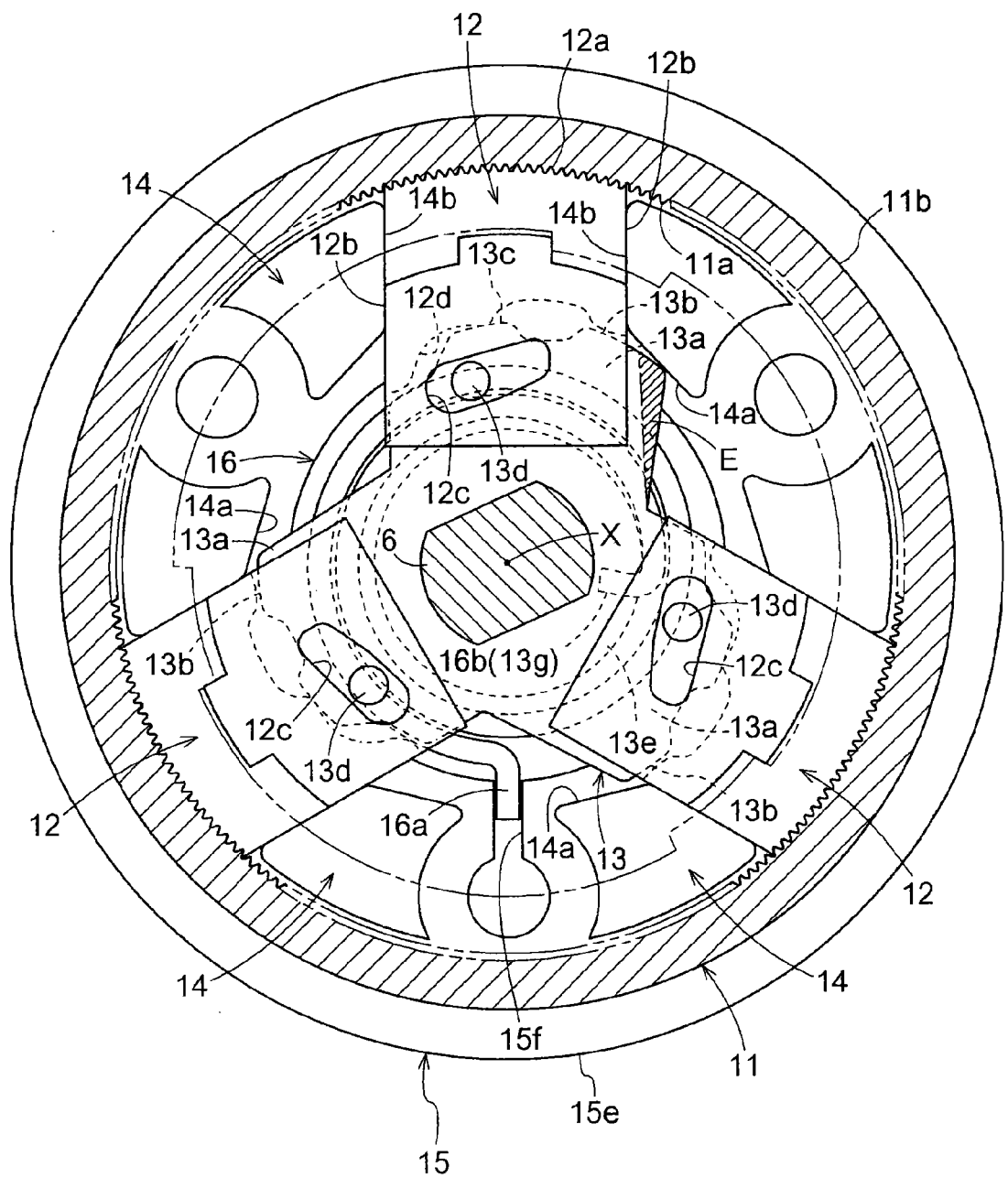
FIG. 4 is a view illustrating a state in which a cam of the lock device according to the embodiment of the present invention is in a lock phase.
Figure 5:
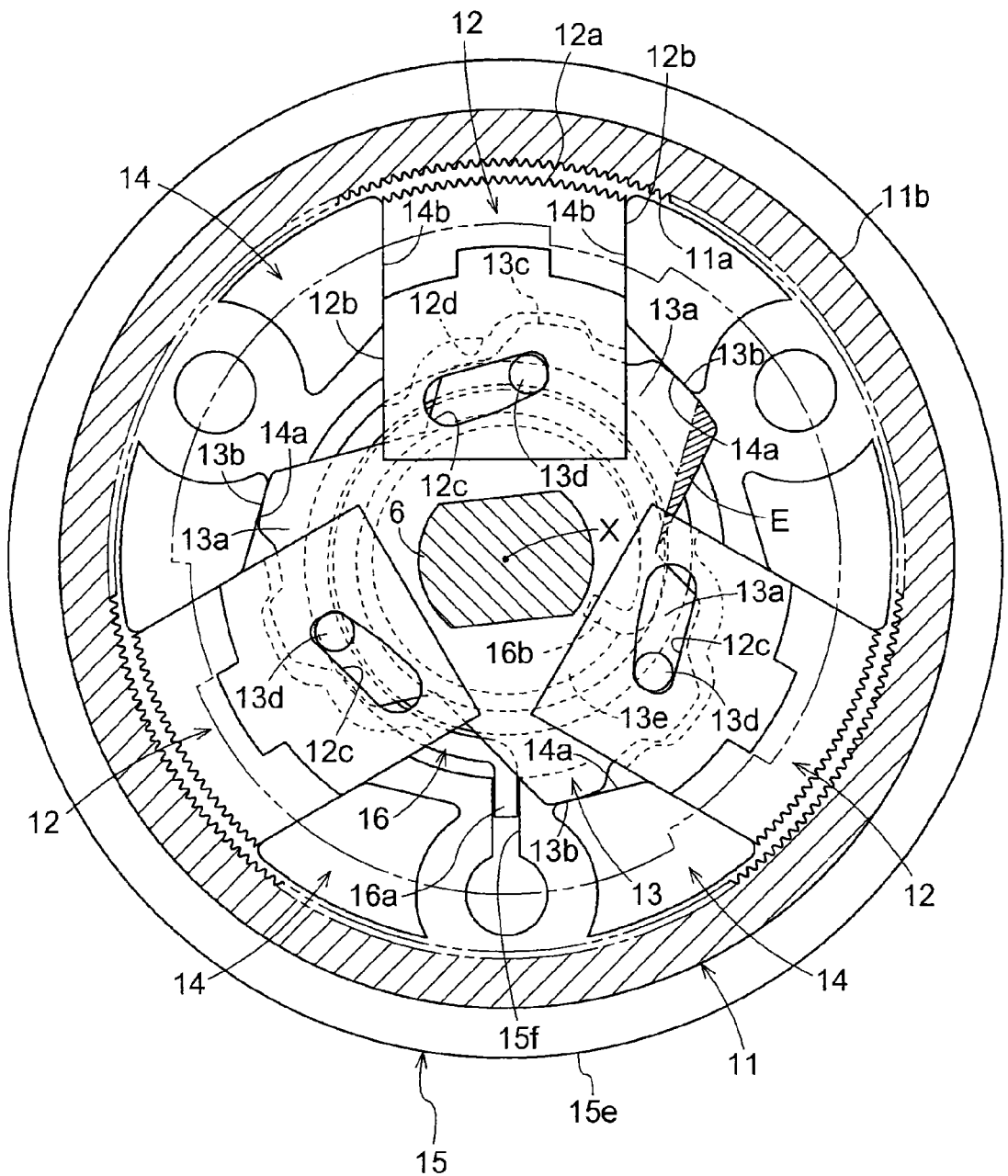
FIG. 5 is a view illustrating a state in which the cam of the lock device according to the embodiment of the present invention is in a release phase.
Figure 6:
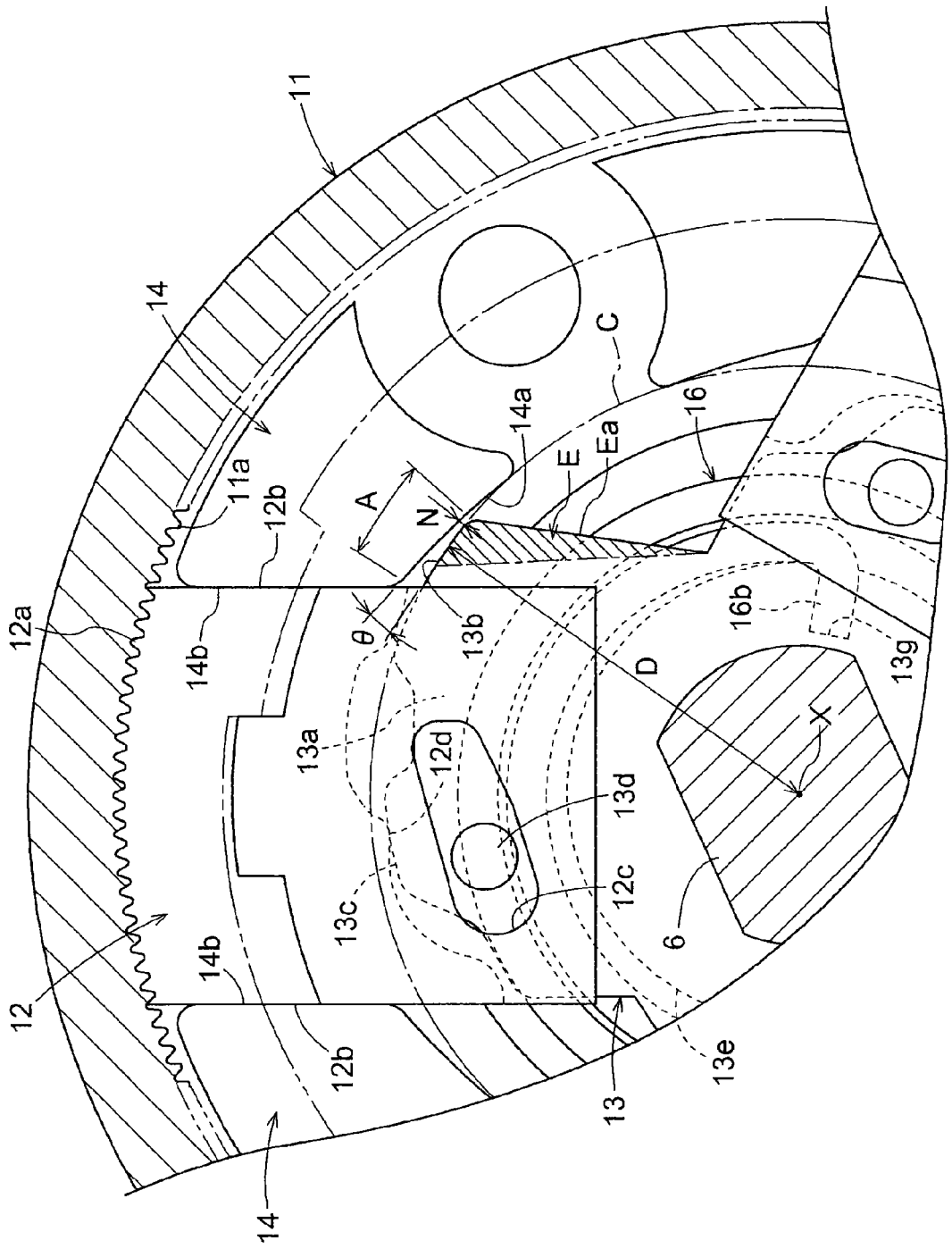
FIG. 6 is an enlarged view of the main portions of FIG. 4.
Figure 7:
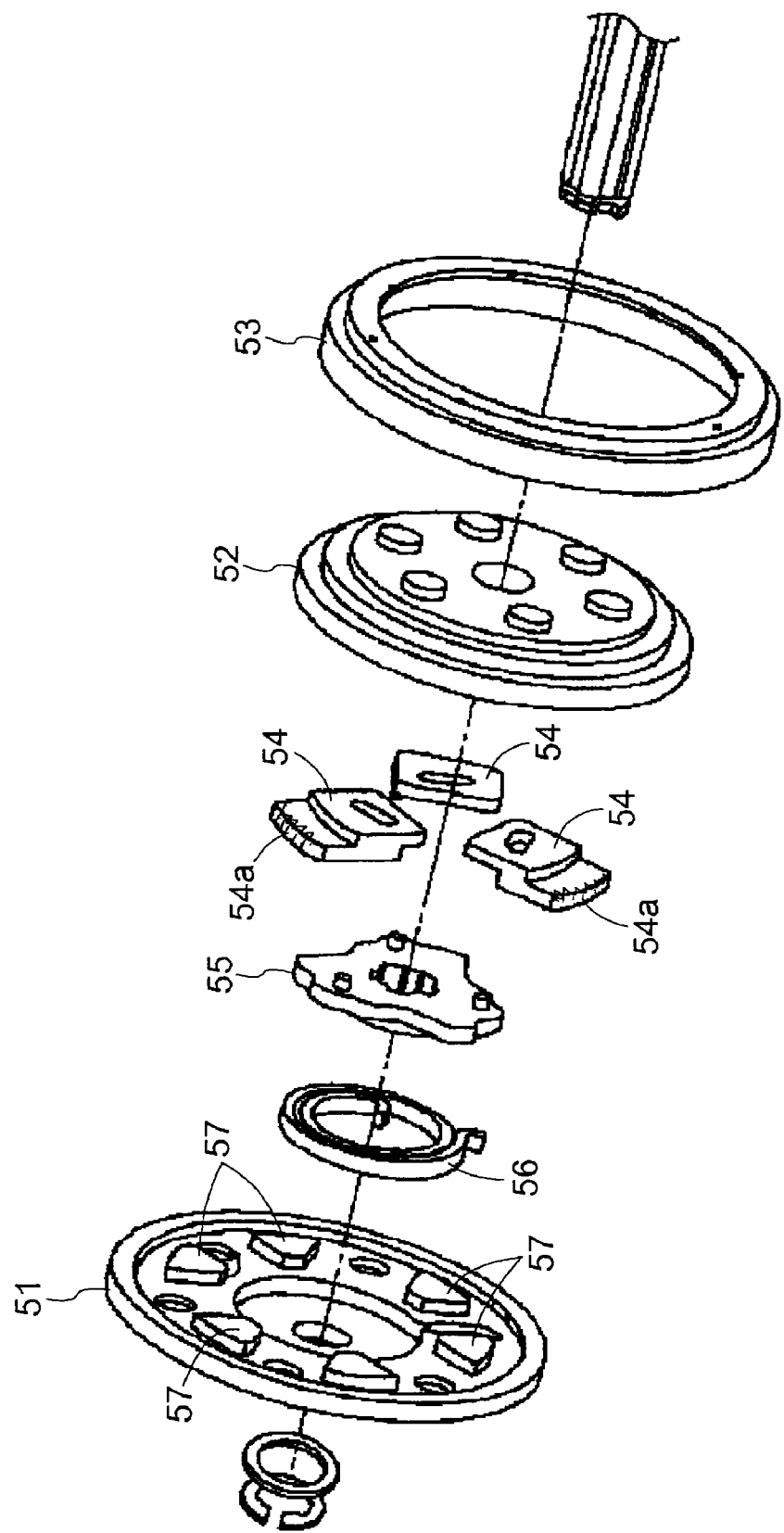
FIG. 7 is an exploded perspective view of a lock device according to a conventional technique.
Figure 8:
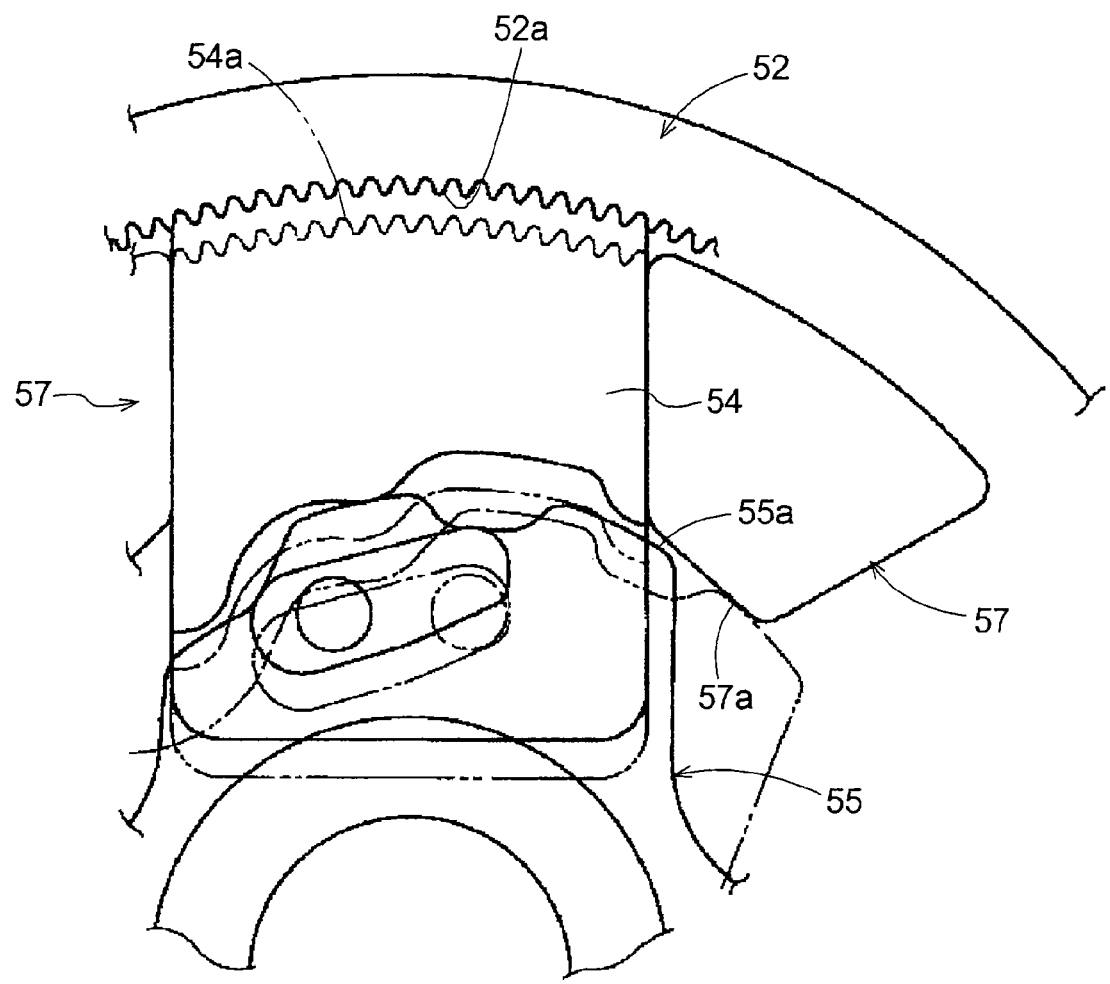
FIG. 8 is an enlarged view of the main portions of the lock device according to the conventional technique.

INDEX TO REFERENCE SYMBOLS 1 lock device
2 seat reclining apparatus
3 seat back frame
4 seat cushion frame
5 operating lever (operation portion)
11 upper gear (first member)
11a internal teeth (engaged portion)
12 pole (lock member)
13 cam (cam member)
13b guided face
14 guide portion (guiding portion)
14a cam guide face (guide face)
15 lower guide (second member)
16 lock spring (biasing member)
A opposed area
C guide circumference
D distance from swing axis of cam to guided face
E extended portion
N gap between guided face and cam guide face
X swing axis
θ angle between tangents of guided face and cam guide face

The invention claimed is:

1. A lock device, comprising:
a first member having an engaged portion;
a lock member capable of being engaged with the engaged portion;
a cam member swinging between a predetermined lock phase and release phase, thereby causing the lock member to operate between an engage posture and a release posture with respect to the engaged portion;
a second member having a guiding portion for guiding swing of the cam member; and
a biasing member for biasing the cam member in a peripheral direction,
wherein the guiding portion has a plurality of guide faces that are arranged away from each other along a circumferential direction,
the cam member has a plurality of guided faces that respectively abut against the plurality of guide faces in the release phase,
the guided face in a direction in which the cam member is decentered by a biasing force of the biasing member is extended to the release phase side with respect to the other guided faces,
wherein the engaged portion is provided along a circumferential direction,
the cam member causes the lock members arranged in plural opposed to the engaged portion along a circumferential direction to synchronously operate, and
the guide faces and the guided faces are not brought into contact with each other in a state where the cam member is in the lock phase and all of the lock members are engaged with the engaged portion.

2. A seat reclining apparatus, comprising the lock device according to claim 1, and capable of adjusting the angle between a seat cushion and a seat back,
wherein the first member is attached to either one of the seat cushion and the seat back,
the second member is attached to the other of the seat cushion and the seat back,
the first member and the second member are engaged with each other in a relatively rotatable manner, and
the seat reclining apparatus further comprises an operation portion for swinging the cam member.

3. A lock device, comprising:
a first member having an engaged portion;
a lock member capable of being engaged with the engaged portion;
a cam member swinging between a predetermined lock phase and release phase, thereby causing the lock member to operate between an engage posture and a release posture with respect to the engaged portion;
a second member having a guiding portion for guiding swing of the cam member; and
a biasing member for biasing the cam member in a peripheral direction,
wherein the guiding portion has a plurality of guide faces that are arranged away from each other along a circumferential direction,
the cam member has a plurality of guided faces that respectively abut against the plurality of guide faces in the release phase,
at least the guided face in a direction in which the cam member is decentered by a biasing force of the biasing member, and the guide face opposed thereto have an area in which the guided face and the guide face are opposed to each other in a state where the cam member is in the lock phase, the length in a peripheral direction of the opposed area is at least one tenth of the distance from a swing axis of the cam member to the guided face, and wherein the angle between a tangent of the guide face and a tangent of the guided face in the opposed area is not greater than 5° in a state where the cam member is in the lock phase.

4. A seat reclining apparatus, comprising the lock device according to claim 3, and capable of adjusting the angle between a seat cushion and a seat back, wherein the first member is attached to either one of the seat cushion and the seat back, the second member is attached to the other of the seat cushion and the seat back, the first member and the second member are engaged with each other in a relatively rotatable manner, and the seat reclining apparatus further comprises an operation portion for swinging the cam member.

5. A lock device, comprising:

a first member having an engaged portion;

a lock member capable of being engaged with the engaged portion;

a cam member swinging between a predetermined lock phase and release phase, thereby causing the lock member to operate between an engage posture and a release posture with respect to the engaged portion;

a second member having a guiding portion for guiding swing of the cam member; and a biasing member for biasing the cam member in a peripheral direction, wherein the guiding portion has a plurality of guide faces that are arranged away from each other along a circumferential direction, the cam member has a plurality of guided faces that respectively abut against the plurality of guide faces in the release phase, and the guided face in a direction in which the cam member is decentered by a biasing force of the biasing member is extended to the release phase side with respect to the other guided faces, wherein the guide faces and the guided faces are formed such that a clearance between the guide faces and the guided faces becomes smaller as the cam member is displaced from the lock phase to the release phase side.

6. A seat reclining apparatus, comprising the lock device according to claim 5, and capable of adjusting the angle between a seat cushion and a seat back, wherein the first member is attached to either one of the seat cushion and the seat back, the second member is attached to the other of the seat cushion and the seat back, the first member and the second member are engaged with each other in a relatively rotatable manner, and the seat reclining apparatus further comprises an operation portion for swinging the cam member.

* * * * *